(No Model.)

C. A. FOLLY.
SCREW COUPLING.

No. 453,555. Patented June 2, 1891.

WITNESSES:

INVENTOR:
C. A. Folly
BY Munn & Co.
ATTORNEYS

UNITED STATES PATENT OFFICE.

CORNELIUS ALFRED FOLLY, OF NEW YORK, N. Y.

SCREW-COUPLING.

SPECIFICATION forming part of Letters Patent No. 453,555, dated June 2, 1891.

Application filed December 3, 1890. Serial No. 373,500. (No model.)

*To all whom it may concern:*

Be it known that I, CORNELIUS ALFRED FOLLY, of New York city, in the county and State of New York, have invented a new and Improved Screw-Coupling, of which the following is a specification, reference being had to the annexed drawings, forming a part thereof, in which—

Figure 1:
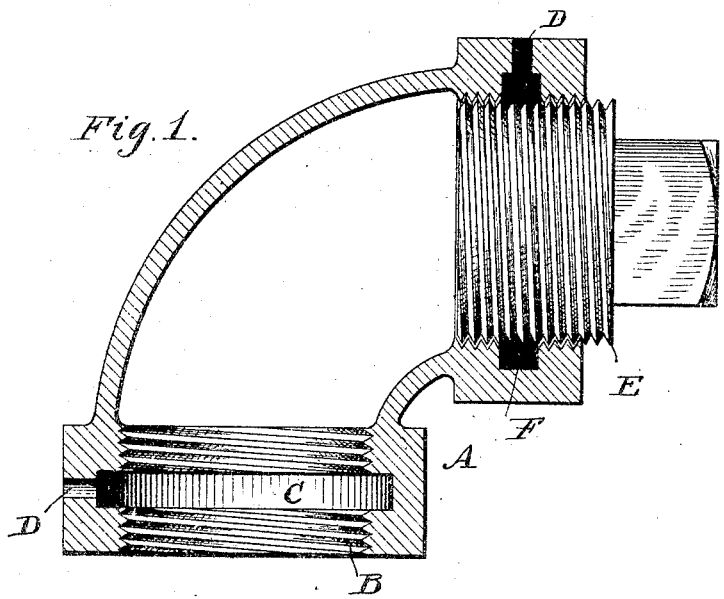
Figure 2:
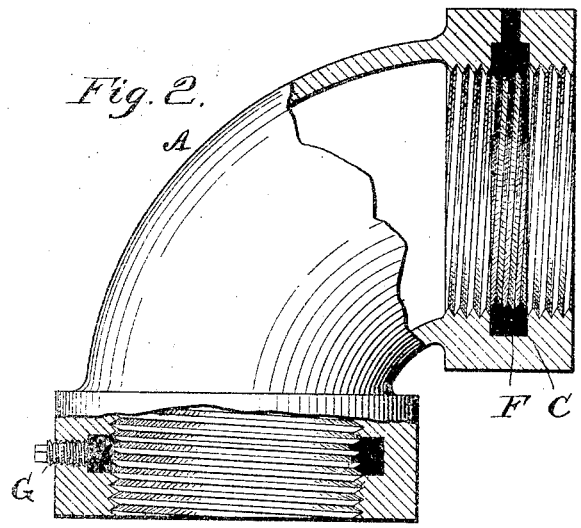

Figure 1 is a longitudinal section of a pipe-elbow, showing one end thereof prepared for the application of my improvement, while the other end illustrates the manner of applying my improvement; and Fig. 2 is a side elevation, partly in section, of a pipe-elbow provided with my improvement.

Similar letters of reference indicate corresponding parts in both views.

The object of my invention is to provide for rendering the screw-couplings of pipes and other screw-joints liquid and gas tight; also, to provide an apparatus for making such joints.

My invention consists in the combination, with the internally-screw-threaded part of a screw-coupling having a circumferential groove cut in the threaded part for receiving a packing-ring of lead or analogous material, of an internally-screw-threaded packing-ring inserted in the groove and made of smaller diameter than the internally-threaded portion of the coupling.

It also consists in an internally-threaded coupling having a lateral hole communicating with the circumferential groove and containing a lead arm formed integrally with the packing-ring or a screw inserted in the coupling and bearing upon the packing-ring for the purpose of taking advantage of the well-known property of the flow of metals for tightening the joint, either by forcing the metal in the lateral hole by means of a punch or by forcing the screw placed in the hole into the packing-ring, thus causing the metal of the ring to flow around and closely fill the circumferential groove, and at the same time also to form an intimate contact with the externally-threaded portion of the coupling.

In describing my invention I have shown its application to a pipe-elbow; but it may be applied with equal advantage to all screw-joints where a tight fit is required.

The elbow A is provided with an internally-threaded portion B, in which at or near the center thereof is formed an internal circumferential groove C, which cuts away a portion of the threads. In the side of the elbow is formed a hole D, which communicates with the circumferential groove C.

To form the packing-ring in the groove C 
an externally-threaded mandrel E, which is
smaller in diameter than the internal diameter of the screw portion of the elbow, is inserted in the threaded portion, as shown, and lead or analogous material is melted and poured through the lateral hole D into the annular space surrounding the mandrel E. When the mandrel E is removed from the threaded portion of the elbow, an internally-threaded soft-metal packing-ring F is left in the groove C, and owing to the reduced diameter of the mandrel E the packing-ring F is of smaller internal diameter than the threaded portion of the elbow. With this construction when the tapered end of the pipe is screwed into the elbow it enters the packing-ring F and expands the same, so as to thoroughly fill the groove C and the threads of the pipe screwed into the elbow. After the pipe has been screwed home and the fit is made as tight as possible by this means, if it becomes necessary to secure a still greater compression of the soft-metal packing-ring F, this may be done by inserting a punch in the hole D and forcing the metal contained therein into the annular space around the pipe. In lieu of a punch, the hole D may be internally threaded and a screw G may be inserted therein, and the compression of the soft metal may be effected by turning the set-screw so as to force it into the metal and cause the metal to flow in the annular space around the pipe. After the joint is made up and applied where steam or hot liquids pass through it the lead of the packing expands back to its normal state by becoming heated and makes an absolute tight joint, it being understood, of course, that the lead has been compressed when cold.

It will be seen that the soft-metal ring is cast in an internally-threaded female member and is of a diameter less than the bore of such threaded member, and that it is then compressed outwardly or expanded by the male member, which not only results in a tightly-compressed ring, but relieves the same of the strain of expansion and contraction, the strain being sustained by the internal threads of the female member and not by the soft ring. In the above construction, also, the pressure applied through the radial opening is additional to and coacts with the outward pressure of the male member of the coupling.

I am aware that a metal packing having shallow threads formed in it has been arranged in an annular groove of a coupling-socket whose internal surface is not threaded, the packing being of less internal diameter than the diameter of the socket, so that when the pipe is screwed into the socket it cuts the thread deeper and is held in the said socket solely by its engagement with the packing; and I am also aware that an internally-threaded socket has been provided with an annular groove, in which is placed a leather or other similar packing, said packing being of less internal diameter than the diameter of the said socket, so that the said packing will be firmly pressed into its socket when the pipe-section is screwed into the said socket, and I therefore do not claim such as my invention.

Having thus described my invention, I claim as new and desire to secure by Letters Patent—

1. In a coupling, the combination, with an internally-screw-threaded female member having an annular groove in its threaded portion, with a portion of the threaded surface on each side of the groove, of a metal packing cast in said groove and having an internal diameter less than the diameter of the said female member, substantially as described.

2. In a coupling, the combination, with an internally-threaded female member having an annular groove in its threaded portion, of a metallic packing cast in said groove and having an internally-threaded surface of less diameter than the diameter of the threaded surface of the female member, whereby when a pipe is screwed into the said female member the packing will be expanded and made to thoroughly fill the groove and the threads of the said pipe, substantially as described.

3. In a coupling, the combination, with an internally-threaded female member having an annular groove and a threaded opening leading from the outside to the said groove, of a soft-metal ring internally screw-threaded and fitting in the said groove, the said ring being of less internal diameter than the diameter of the said internally-threaded female member, and a screw-threaded plug for closing the said opening and compressing the soft-metal ring into the groove, substantially as and for the purpose set forth.

CORNELIUS ALFRED FOLLY.

Witnesses:
EDWD. M. CLARK,
EDGAR TATE.